Dec. 23, 1952   C. H. HONEYCUTT   2,622,666
TOOL FOR SEPARATING TWO-PART RIMS OR WHEELS OF VEHICLES
Filed June 19, 1950
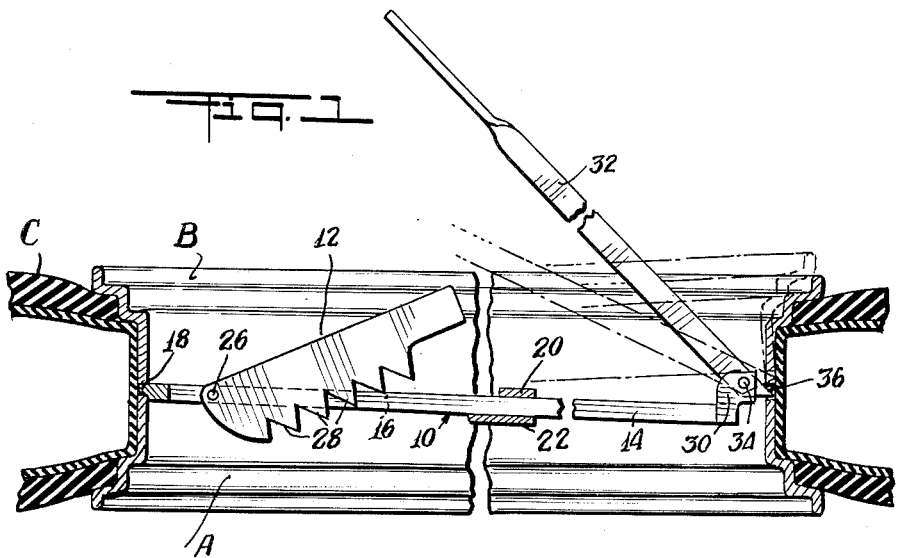
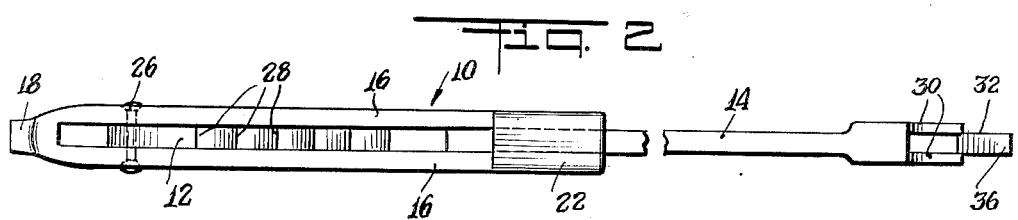
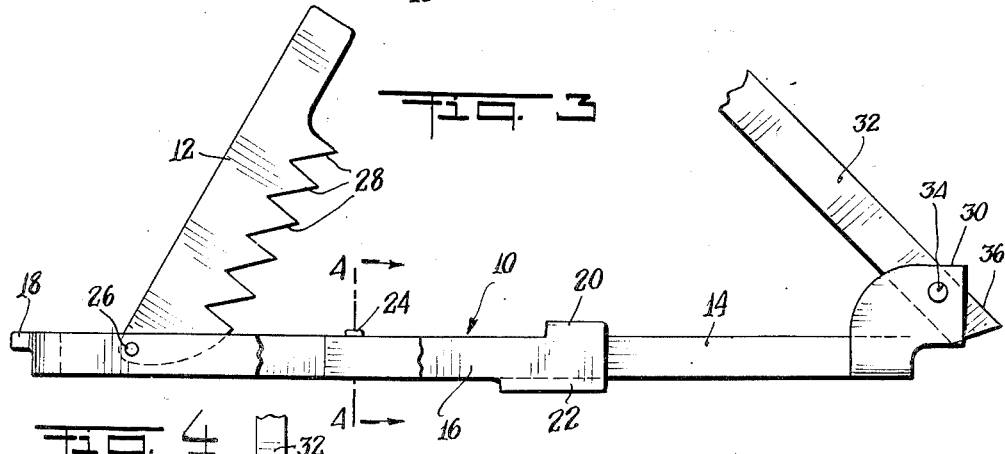
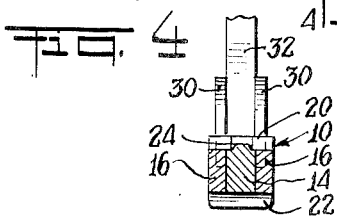
INVENTOR.
Connie H. Honeycutt
BY
Charles E. Lightfoot
ATTORNEY Patented Dec. 23, 1952

2,622,666

UNITED STATES PATENT OFFICE 2,622,666

TOOL FOR SEPARATING TWO-PART RIMS OR WHEELS OF VEHICLES

Connie H. Honeycutt, Houston, Tex.

Application June 19, 1950, Serial No. 169,027

2 Claims. (Cl. 157—1.35)

1

This invention relates to a tool for separating two-part rims or wheels of vehicles, and more particularly to a tool for loosening and removing a separable rim or vehicle wheel preparatory to the removal of the same from a tire mounted thereon.

The invention is especially useful in connection with two-piece rims or wheels having a continuous circular base and a side ring cooperable with the base, the entire device fitting inside a pneumatic tire for mounting the same. In rim structures of this kind the base portion may be provided with a circumferential depression sometimes referred to as a gutter, and the ring of the rim has a portion adapted to snap into the depression to retain the base and ring assembled in the tire. The ring may also be provided with a notch into which the end of a prying implement may be inserted to aid in the separation of the parts when undertaking the removal of the rim from the tire.

The separation of the circumferentially engaging parts of a rim of the type described, by means of a pry bar or other implement customarily used for the purpose, is difficult and time consuming, as well as hazardous to the operator, and especially so in the case of rims of large size requiring the application of excessive force to separate the parts. The use of a pry bar or other similar implement in the removal of rims of this character is also undesirable in that the rim is frequently battered and deformed by prying or hammering thereon, to an extent to seriously interfere with the ready reassembly and continued use of the rim.

This invention has for its principal object the provision of a rim separating tool, whereby the above mentioned disadvantages are obviated, and a means is afforded for the quick and easy separation of such rims preparatory to removing the same from the tires.

Another object of the invention is to provide a rim separating tool having means for cooperation with the circumferentially connected separable parts of the rim and operable thereon to effectively unlock and separate the parts without hammering or otherwise battering and damaging the rim.

A further object of the invention is the provision of a rim separating tool which is adjustable for use with a number of rims of different sizes and which can be quickly and easily adjusted to the proper size while applying the tool to the rim.

The invention also contemplates the provision

2 of a rim separating tool of the character referred to which is of collapsible construction and capable of being folded into a compact unit, taking up little space, and easily stored in a tool kit or other convenient place for ready accessibility.

A still further object of the invention is to provide a rim separating tool having few parts and capable of long withstanding the hard usage received by an article of this character.

The invention may best be understood by reference to the following detailed description of the construction and mode of operation of the same, when considered in connection with the annexed drawings in which:

Figure 1 is a side elevational view of the invention, partly in section, showing the same applied to the rim of a vehicle wheel and indicating the manner in which the invention is used;

Figure 2 is a bottom plan view of the invention as shown in Figure 1;

Figure 3 is a fragmentary side elevational view, partly broken away, showing in detail structural features of the invention; and, Figure 4 is a cross-sectional view taken along line 4—4 of Figure 3.

Referring now to the drawings in greater detail the invention is shown in Figure 1 in its application to a vehicle wheel structure wherein wheel or rim may be of the two-part type having a circular base portion A and a ring portion B adapted to fit within the tire C and circumferentially secured together in any suitable manner.

The rim or wheel separating tool comprises a centrally disposed frame or body member 10 having an adjustable stop member in the form of a toothed dog 12 pivoted near one end, and an extension member 14 slidable telescopically through the opposite end.

The frame or body member 10 is formed with spaced sides 16, joined at one end to provide a rim engaging member in the form of a toothlike projection 18, and connected together at the opposite end by upper and lower web portions 20 and 22, respectively. The sides 16 are spaced at the end between the webs 20 and 22 to form an opening for the reception of the extension 14 which is slideably received between the sides and which forms a part of rim engaging means carried by the frame. A projection 24 is formed near the inner end of the extension member for engagement with the web 20 to prevent removal of the extension from the frame member.

The dog 12 is pivotally mounted between the sides 16 by a pin 26, and has a plurality of teeth 28 projecting from its lower edge. The dog may move downwardly between the sides 16, and its length is preferably such that the outer end portion will engage the inside of the lower web 22 to prevent the dog from swinging downwardly beyond the frame.

At its outer end the extension member 14 has spaced upwardly and outwardly extending lugs 30 between which an operating lever 32 is pivoted on a pin 34. The lever 32 extends beyond the pin 34 and is formed with prying or camming point 36 at its lower end for engagement with the rim at a point opposite the member 18.

It will be seen from an inspection of the drawings that the dog 12 may be moved downwardly until it lies substantially between the sides 16 of the frame and is supported in this position by engagement with the inside of the lower web 22, and the operating lever may be moved downwardly against the upper web 20 of the frame member, by reason of the upwardly extending pivot lugs 30, so that when folded, the tool forms a very compact unit, easily carried about and capable of being stored in a small space.

In making use of the tool, the tooth-like projection 18 is forced between the engaging portions of the base A and ring B by the use of a suitable pry bar or otherwise, the extension member is extended to a point substantially diametrically opposite the extension 18, and the camming point 36 is similarly forced between the base and ring of the rim with the lever 32 in partially elevated position. The toothed dog is then swung downwardly between the sides 16 until one of the teeth engages the inner end of the extension member. By pushing down on the lever 32 with the tool in the position as described the prying or camming point 36 may be forced upwardly, as indicated in dotted lines in Figure 1, to separate the parts of the rim. The above described operation may, of course, be repeated as often as necessary, changing the position of the tool with relation to the rim each time, until the parts of the rim are separated sufficiently to enable the same to be completely removed from the tire.

There may be as many teeth 28 in the dog 12 as is desirable and the teeth may be suitably spaced to enable the tool to be adjusted to fit various sizes of rims.

It will thus be seen that the invention affords a rim separating tool of simple construction, possessing great strength and having a wide range of adjustability, and which is also compactly foldable for storage in a tool kit or other convenient location.

While the invention has been disclosed in connection with a specific embodiment of the same, it will be understood that this is intended by way of illustration only, and numerous changes can be made in the construction of the various parts and the arrangement thereof without departing from the spirit of the invention or the scope of the appended claims.

Having clearly disclosed the invention, what is claimed as new and desired to secure by Letters Patent is:

1. A tool for separating a tire-supporting wheel rim having laterally separable interengaging circular parts comprising a frame member adapted to be diametrically positioned inside the rim, rim engaging means on said frame member engageable with the rim between said parts, said means also having a laterally extending surface portion engageable with one of said parts, an extension member slideably adjustable in said frame member to project from said frame member opposite said means, a toothed dog pivoted on said frame member and engageable with said extension member to hold said extension member in adjusted position projecting from said frame member, and moveable means carried on said extension member engageable with said rim between the parts at a point diametrically opposite said rim engaging means and operable to pry said parts apart.

2. A tool for separating a tire-supporting wheel rim having laterally separable interengaging circular parts comprising a frame member adapted to be positioned inside the rim, a rim engaging element on said frame member having a projection engageable with the rim between said parts and a surface portion at one side of said projection engageable with one of said parts, an extension member slideably adjustable in said frame member and having an end projecting therefrom opposite said element, an adjustable dog on said frame member engageable with the opposite end of said extension member to hold said extension member in adjusted position, and prying means carried on the projecting end of said extension member and engageable between said parts at a point diametrically opposite said element and operable to pry said parts apart.

CONNIE H. HONEYCUTT.

REFERENCES CITED

The following references are of record in the file of this patent:

UNITED STATES PATENTS

| Number | Name | Date |
|---|---|---|
| 373,528 | Judd | Nov. 22, 1887 |
| 1,148,046 | Purdy | July 27, 1915 |
| 1,290,227 | Keenum | Jan. 7, 1919 |
| 1,410,861 | Wolf | Mar. 28, 1922 |
| 1,410,910 | Gauthier | Mar. 28, 1922 |
| 1,639,887 | Hatfield | Aug. 23, 1927 |
| 1,742,590 | Freivogel | Jan. 7, 1930 |
| 1,917,585 | Hill et al. | July 11, 1933 |